United States Patent
Brink et al.

[15] 3,639,111
[45] Feb. 1, 1972

[54] METHOD AND APPARATUS FOR PREVENTING FORMATION OF ATMOSPHERIC POLLUTANTS IN THE COMBUSTION OF ORGANIC MATERIAL

[72] Inventors: David L. Brink; Jerome F. Thomas, both of Berkeley, Calif.

[73] Assignee: The Regents of the University of California

[22] Filed: Jan. 30, 1969

[21] Appl. No.: 795,288

[52] U.S. Cl. ................................. 48/111, 23/48, 23/262, 23/277 R, 48/197 R, 48/203, 48/209, 201/15, 201/34, 201/44, 201/27, 202/113, 202/117, 202/124
[51] Int. Cl. ..................... C10j 3/10, C10j 3/14, C10j 3/20
[58] Field of Search ................. 48/203, 197 R, 209, 111; 23/277 R, 262, 48

[56] References Cited

UNITED STATES PATENTS

| | | | |
|---|---|---|---|
| 1,799,885 | 4/1931 | Chavanne | 48/203 |
| 1,818,901 | 8/1931 | Mallery | 48/197 X |
| 2,535,730 | 12/1950 | Gadret | 23/48 |
| 2,946,670 | 7/1960 | Whaley | 48/203 X |
| 2,992,906 | 7/1961 | Guptill | 48/203 X |
| 3,110,578 | 11/1963 | Severson et al. | 48/203 |
| 3,323,858 | 6/1967 | Guerrieri | 23/48 |
| 3,333,917 | 8/1967 | Bergholm | 23/262 X |
| 3,471,275 | 10/1969 | Borggreen | 48/197 X |

FOREIGN PATENTS OR APPLICATIONS

| | | | |
|---|---|---|---|
| 671,026 | 9/1963 | Canada | 48/197 |
| 578,711 | 7/1946 | Great Britain | 48/203 |

Primary Examiner—Morris O. Wolk
Assistant Examiner—Barry S. Richman
Attorney—Stanley Bialos

[57] ABSTRACT

Organic material, such as kraft black liquor, organic fuels, garbage and organic wastes, is destructively distilled and pyrolyzed at an elevated temperature and for a time sufficient to break down the material to noncombustible solids and to a stable gaseous clean burning fuel. The temperature is maintained to preclude recombination of intermediate products formed during the pyrolysis and which would otherwise pollute the atmosphere. A controlled amount of oxygen is continuously introduced during the cracking to provide energy by exothermic oxidative reactions but the oxygen is insufficient to effect stoichiometric or in other words complete combustion.

12 Claims, 1 Drawing Figure

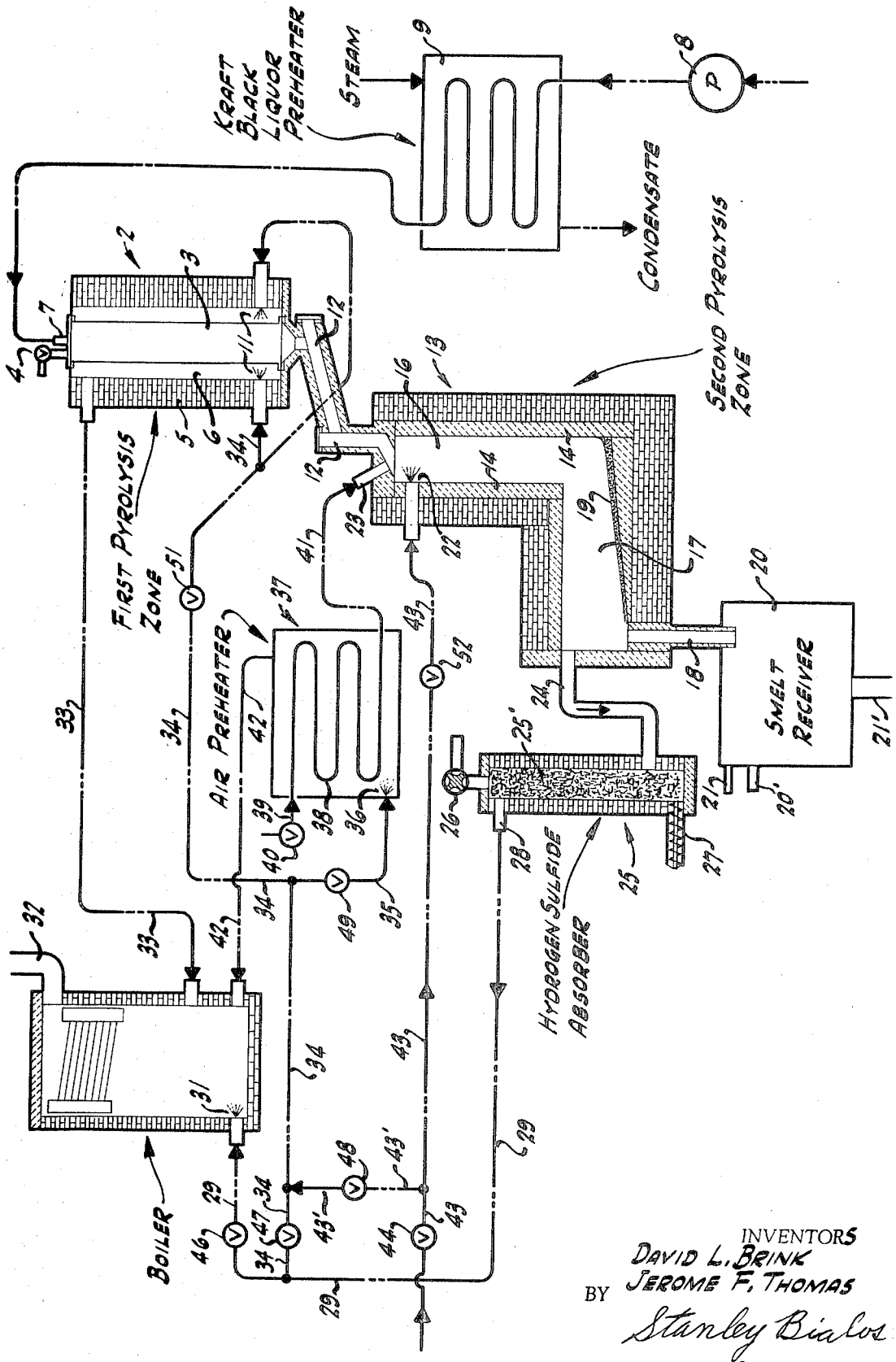

3,639,111

METHOD AND APPARATUS FOR PREVENTING FORMATION OF ATMOSPHERIC POLLUTANTS IN THE COMBUSTION OF ORGANIC MATERIAL

BACKGROUND OF THE INVENTION

The pollution of the atmosphere caused by combustion of organic material containing carbon, hydrogen and oxygen is a problem of great concern. For example, in the recovery process of kraft black liquor which contains sulfur compounds, and which is carried out by oxidative combustion of the black liquor in a recovery furnace, gaseous pollutants are discharged into the atmosphere. These pollutants include malodorous mercaptans, and organic sulfides and polysulfides formed during the combustion, as well as other organic products which pollute the atmosphere. Even if the organic raw material does not contain sulfur, such as garbage or other wastes, the atmosphere becomes polluted with a wide variety of degraded and reformed organic products formed by oxidative combustion in an incinerator. Similarly, combustion of fuels, such as soft coal, is responsible for formation of substantial amounts of pollutants.

It is known that in the combustion of organic material, there is a simultaneous occurrence of endothermic and exothermic reactions during which very reactive intermediate products such as carbon free radical fragments (i.e., free radicals containing carbon), atomic hydrogen, atomic oxygen, hydroxyl free radicals and perhydroxy free radicals, are formed. The reactive intermediate carbon free radicals in typical combustion processes recombine and form gaseous air pollutants such as saturated and unsaturated aliphatics and polynuclear aromatics (arenes).

SUMMARY AND OBJECTS

Pursuant to this invention, it has been found by destructively distilling and pyrolyzing organic material above a critical temperature zone and for a sufficient length of time, gases from the material can be reduced or cracked to stable end products which comprise a simple stable clean burning gaseous fuel. By maintaining pyrolysis above such critical temperature, recombination reactions of the unstable intermediate products formed during the combustion are prevented, thus eliminating pollutants. The gaseous end product can be burned as any other typical fuel but will burn clean without polluting the atmosphere.

Although indirect heating may be used, the pyrolysis process is advantageously rendered self-sustaining by introducing just sufficient oxygen to produce heat for providing the cracking temperature. However, the amount of oxygen is insufficient to effect complete stoichiometric combustion; and if extensive oxidation of the material were to occur, pollutants would be formed.

From the preceding, it is seen that the invention has as its objects, among others, the provision of a simple method and apparatus for pyrolyzing and destructively distilling organic material, especially organic waste material, which will prevent formation of atmospheric pollutants; can be expeditiously performed; will form a clean fuel that can be burned to provide energy; and which is applicable to the treatment of kraft black liquor to obviate formation of malodorous gases. Other objects of the invention will become apparent from the following more detailed description and accompanying drawing in which, the single FIGURE is a schematic view of an apparatus system particularly adapted for the pyrolysis of organic material, such as kraft black liquor.

In greater detail, the invention, as previously stated, is particularly adapted for the treatment of any organic material containing carbon, hydrogen and oxygen, such as fossil fuels (i.e., coal and peat), and various organic wastes comprising wood, bark, agricultural residues, and municipal sanitary and solid wastes including garbage. The organic material may include other ions such as sulfur as in the case of kraft black liquor or soft coal, or halogens such as chlorine in synthetic polymers. The sulfur and halogen can be readily absorbed in the form of hydrogen sulfide or hydrogen halide, respectively, to which they are converted during the method hereof. In the combustion of organic material, it is continuously vaporized and progressively degraded to smaller and smaller fragments which include carbon free radical fragments, atomic hydrogen, atomic oxygen, hydroxyl free radicals, and perhydroxy free radicals as intermediate products. Below a critical temperature zone the carbon free radicals recombine and form pollutants.

To prevent such recombination reactions, it has been found pursuant to this invention that if the temperature is maintained sufficiently high and pyrolysis and destructive distillation (cracking of the material) are effected in an enclosed zone under reducing conditions, the components of the resultant gas are completely broken down to a stable fuel which consists essentially of molecular hydrogen ($H_2$), methane ($CH_4$), carbon monoxide ($CO$), and carbon dioxide ($CO_2$). In this connection, carbon dioxide is not considered a pollutant because it naturally occurs in the atmosphere. As a result of such complete cracking, the simple stable clean burning fuel will usually contain at least about 50 percent by volume of molecular hydrogen, with about 20 percent carbon monoxide, 20–30 percent carbon dioxide, and about 2–3 percent methane.

In the event that the organic material to be pyrolyzed is kraft black liquor resulting from the well known kraft (sulfate) process in the pulping of wood, and which contains sodium salts, appreciable amounts of organic sulfur compounds, sodium sulfide, sodium thiosulfate, and traces of sodium sulfate, lime, iron oxide, alumina and potash, substantially all the atomic sulfur is converted to sulfide. The sulfide is distributed between sodium sulfide ($Na_2S$) in the ash and hydrogen sulfide ($H_2S$) in the gaseous end product. The hydrogen sulfide is readily removed from the gaseous fuel at the elevated temperature of the fuel by scrubbing with an alkali such as calcium carbonate, calcium oxide, sodium hydroxide or sodium carbonate.

It is important in conducting the method, that the organic material be completely pyrolyzed and destructively distilled at a sufficiently high temperature and for a sufficient length of time to prevent the aforementioned recombination reactions, and thus produce the aforementioned stable end products. When produced, these end products will not recombine, and the resultant fuel will burn clean in the presence of oxygen and can be employed for energy purposes. As will be explained more fully hereinafter, a portion of the fuel is employed for providing heat energy in the pyrolysis system.

The destructive distillation and pyrolysis may be carried out in a single enclosed zone. The temperature at which recombination reactions are substantially precluded and a stable gaseous end product is formed has been found to commence in the temperature range of about 750° C. to 800° C. To insure that no recombination reactions will occur, the pyrolysis is conducted above the upper limit of this 750° C. to 800° C. temperature zone. A suitable temperature range is about 800° C. to 1,200° C. or higher and the time about 1 to 30 seconds. Temperatures above 1,200° C. may be employed but because of the detrimental affect on the equipment in which the pyrolysis is conducted such higher temperatures become increasingly impractical on a commercial basis.

As for time of pyrolysis, it is a function of temperature, decreasing as temperature is increased. The minimum time at any temperature is that required to produce the simple end product fuel from a particular organic feed material while the maximum time is immaterial as once such fuel is formed it remains stable. However, unnecessary time increases costs and thereby adversely affects economics of the process.

Advantageously, for purposes of most effective heating, it is desirable to initiate a reductive pyrolysis of the material in a first zone in which indirect heat is employed and from which the material is fed to a second pyrolysis and destructive distillation zone in which the simple stable clean gaseous end product is formed by the cracking. Whether one or two zones are used, after the gaseous components have been broken down or cracked to the stable end components, they will not recombine. Pyrolysis commences at a temperature of above about 200° C. A desirable temperature in this first zone is in the range of about 400° C. to 750° C. At the elevated temperature of the first zone, liquids, such as water, are vaporized thus leaving solid residue which together with gases are transferred to the second zone in which the pyrolysis is completed. Time in the first zone is not critical and can be selected to achieve maximum overall process efficiency; 1 to 20 seconds will normally suffice but may be extended if such extension does not adversely affect economics of the process.

In the first zone, external heat is applied to an enclosed vessel in which the initiation of the pyrolysis is conducted so that indirect heating of the feed material is employed. The vessel is made of material, desirably stainless steel, which is resistant to corrosion and erosion at temperatures below about 750° C. Thus, the material of the vessel determines the maximum temperature of the first pyrolysis zone. For insuring a satisfactory rate of initial pyrolysis, the temperature should be above about 400° C.; and to prevent corrosion of the vessel, the temperature should be less than about 750° C.

In the pyrolysis zone wherein the temperature is sufficiently high (the second zone when two zones are employed) to form the simple stable clean burning fuel, external heat may be applied to maintain the temperature but is impractical with current commercial construction materials because of low heat transfer coefficients of these materials. In order to achieve the requisite cracking temperature in such zone, it is desirable and advantageous to introduce a controlled amount of oxygen which initiates exothermic oxidative reactions to supply and maintain that amount of heat necessary to bring the temperature in such pyrolysis zone in the desired range of 800° C. to 1,200° C. In this connection, the term "oxygen" herein, is to be construed as including air which is employed as the source of oxygen.

The amount of oxygen which is introduced should be at a minimum, just sufficient to maintain the cracking temperature desired, which will vary with the type of material being pyrolyzed and equipment configuration and design. Oxygen over this minimum can be employed but then the resultant pyrolysis gas from the cracking zone will be diminished in fuel value which is to be avoided as this would result in loss of energy production when the pyrolysis gases are subsequently burned as fuel.

Generally, the amount of oxygen should be up to about 15 percent of that amount of oxygen required for complete stoichiometric combustion to achieve the pyrolysis temperature in the range of 800° C. to 1,200° C. The oxygen is introduced at a point source in the pyrolysis zone such that it reacts continuously with combustible gases and carbon, and thereby is continuously and entirely consumed in a limited combustion section of the pyrolysis zone thus obviating buildup in the concentration of free oxygen in the pyrolyzing gases. Also, since the oxygen is entirely consumed in this limited section, as the gases and material move from such section, the transitory oxidative conditions thereat reconvert to reductive conditions under which cracking and pyrolysis are sustained. If sufficient external heat can be employed to reach the desired temperature, the need for oxygen is obviated, and the entire pyrolytic process is under reducing conditions.

As a typical example of the method hereof as applied to kraft black liquor, reference is made to the schematic drawing. A first pyrolysis unit 2 is provided comprising an upright stainless steel cylindrical vessel 3 which is the first pyrolysis zone and is about 6 feet in height and 8 inches in diameter; the vessel being provided with a safety valve 4 and being enclosed in a refractory furnace chamber 5 providing annular heating space 6 about the vessel. Kraft black liquor is continuously sprayed into the vessel through the top thereof by spray nozzle 7 through which it is fed by pump 8; the liquor being preheated to any suitable temperature in preheater 9. Burners 11 are provided at the bottom of chamber 5 to apply the requisite heat to vessel 3. In vessel 3 not only is initial pyrolysis effected but the liquid is flash dried to dry solids.

From vessel 3 the partially pyrolyzed material flows by gravity through conduits 12 into the second pyrolysis and destructive distillation zone 13 wherein the final stable clean burning gaseous end product is produced. Because of the high temperature to which the material is subjected in this zone, the inside wall surfaces are lined with basic ceramic refractory lining 14. Zone 13 has an upright portion 16 rectangular in cross section and below vessel 3, and a horizontal portion 17 also rectangular in cross section communicating with the bottom of upright portion 16, both of which are about 6 feet long.

Vertical portion 16 is about one foot wide and three-fourths of a foot deep; and the horizontal portion is about one foot in height at its inlet end and about 1½ ft. in height at the opposite discharge end; the depth being the same as that of the vertical portion. The floor of the horizontal portion slopes downwardly to a sump at the smelt discharge spout 18 which conducts the resultant smelt, indicated at 19, into a smelt receiver tank 20 having gas vent 21 leading to any suitable water seal trap (not shown), and serving the same function as the smelt tank employed in the conventional kraft black liquor recovery process. As usual in such a process, tank 20 contains a weak alkaline aqueous liquor continuously fed into the tank through inlet 20' and in which the smelt is dissolved to form so-called green liquor which flows from the tank through outlet 21' to be treated further in the recovery process.

At its upper end, the vertical portion 16 is provided with a burner 22 for burning supplemental fuel to bring the second pyrolysis zone up to temperature in the startup operation. When the operating temperature is reached, firing with supplemental fuel is discontinued and operating temperature is sustained by introduction of air through inlet 23 at the upper end of vertical portion 16, which renders the pyrolysis self-sustaining as was previously described.

Stable clean burning fuel flows out of outlet 24 at the discharge end of horizontal portion 17 into absorber 25 into which any suitable alkali 25' which will absorb hydrogen sulfide, such as calcium carbonate, is continuously charged through rotary sealing valve 26 and continuously removed by sealed screw conveyors 27. The resultant clean burning combustible fuel flows out of outlet 28 of the absorber, and is conducted by tubing 29 to burner 31 of a boiler for generating steam; the burner gases being discharged from the boiler stack 32. Flue gases produced by burners 11 in the first zone 2 are also conducted to the boiler by tubing 33.

Because of the complete pyrolysis in the second pyrolysis zone 13, there is considerable excess energy available; and the stable fuel formed therein is conducted from tubing 29 through tubing 34 to burners 11 of the first zone 2 to effect continuous initiation of pyrolysis of the feed material in vessel 3. Air introduced into second reaction zone 13 is desirably preheated to minimize the amount of air required for achieving the desired temperature. For this purpose, pyrolysis gas is conducted by tubing 35 which is connected to tubing 34 and to a burner 36 supplying heat to preheater 37 containing coil 38 connected to air inlet pipe 39 into which requisite air is admitted by a control valve 40 connected to a suitable blower (not shown). Coil 38 is also connected by tubing 41 to air inlet 23. The combustion gases from preheater 37 are conducted by tubing 42 to the boiler where its residual heat is utilized.

When once started, the process is self-sustaining. However, to bring the system up to temperature to start the same, supplemental fuel must be employed to supply the necessary heat, and desirably natural gas is used, or, in its absence, other fuel. This gas is conducted from a suitable source thereof by tubing 43 to second pyrolysis zone burner 22; and a valve controlled bypass line 43' is connected to tubing 43 to conduct some of the gas through line 34 to burners 11 of the first pyrolysis unit, and through line 35 to burner 36 of air preheater 37.

A main valve 44 in line 43 controls the supply of supplemental fuel. As indicated in the drawing, additional valves 46, 47, 48, 49, 51 and 52 are provided at suitable locations to appropriately control gas flow during the startup and pyrolysis operations. After the requisite temperatures have been established, the flow of supplemental fuel is discontinued, and the system is operated continuously. In this connection, during startup valve 47 is closed to preclude back flow of supplemental fuel through line 29 into absorber outlet 28, but is maintained open after startup when the supplemental fuel is shut off by valve 44.

Typical conditions for effecting complete destructive distillation and pyrolysis of kraft black liquor to the simple clean burning fuel end product are as follows:

Kraft black liquor, composed essentially of degradation products of lignin and carbohydrates solubilized by sodium hydroxide and sodium sulfide in the wood pulp operation, and containing about 50 percent solids after concentration, is continuously fed by pump 8 through preheater 9 maintained at a desirable temperature of about 220° C. The rate of continuous feed through spray nozzle 7 is about 2 lbs. of the concentrated liquor per minute. The residence time of the continually flowing material in vessel 3 is about 10 seconds; the mean temperature of the wall of the vessel being maintained at about 600° C. At this temperature and time the destructive distillation and pyrolysis has commenced; and by the time the material flows by gravity from the vessel 3 it is flash dried to complete solids whereby water vapor is present.

The temperature in the second reaction zone is maintained at about 900° C. to 1,200° C. with the maximum temperature being attained downstream of air inlet 23, the total time of passage through the second zone being about 10 seconds which is sufficient to obtain complete cracking without formation of intermediate recombination reaction products. To achieve the temperature for maintaining this pyrolysis and destructive distillation self-sustaining, about 0.6 lbs. of air per pound of black liquor (containing about 50 percent solids) is fed into air inlet 23 of the second reaction zone. Air is heated in the preheater to about 1,000° C.

The above temperatures and times for the cracking of kraft black liquor are merely by way of example. All that is necessary for treatment of such liquor as well as for other organic material, is to heat at a sufficiently high temperature and for sufficient residence time in an enclosed zone so as to prevent recombination reactions and thus form as the gaseous end product a simple clean burning fuel comprising a gaseous mixture of hydrogen, carbon monoxide, carbon dioxide and methane. In the case of black liquor at such cracking temperature substantially all of the sulfur in the pyrolysis gas is present as hydrogen sulfide which is scrubbed out. This simple gaseous mixture when burned results in an exceedingly hot clean flame because of the nature of the fuel. Inasmuch as substantially all the sulfur is reduced to sulfide which is removed as previously described, the combustion products of the pyrolysis gas are odor-free.

In the example, although the solids concentration of the kraft black liquor is about 50 percent this is not critical as dry solid organic material as well as liquids, any liquid material containing solids can be pyrolyzed by the method hereof. However, where the moisture content is relatively high, it is preferable to reduce the moisture content by evaporation to an optimum value in order that heat requirements to achieve the desired elevated cracking temperature is thus minimized. Generally, concentration to about 40 percent to 60 percent solids is satisfactory but if the material originally contains less than 40 percent solids it need not be concentrated.

We claim:

1. The method of producing a stable gaseous fuel by the combustion of organic material while preventing the formation of atmospheric pollutants which comprises effecting destructive distillation and pyrolysis of such material in an enclosed zone at an elevated cracking temperature for a time sufficient to form as the gaseous end product a stable clean burning fuel while maintaining such temperature to preclude recombination reactions of intermediate products comprising carbon free radicals formed during such destructive distillation and pyrolysis and thus prevent formation of gaseous saturated and unsaturated aliphatic and polynuclear aromatic air pollutants in said fuel, and allowing such stable gaseous fuel to discharge from such zone; said destructive distillation and pyrolysis being initiated in a first enclosed pyrolysis zone maintained at a temperature below said cracking temperature at which recombination reactions of said intermediate products are prevented but which is effective to vaporize water and other liquids present and to initiate pyrolysis of the organic material, and wherein hot effluent from first zone is passed into a second enclosed pyrolysis zone wherein said cracking temperature is maintained to prevent said recombination reactions and to form said stable gaseous fuel.

2. The method of claim 1 wherein oxygen is introduced into said second zone in an amount sufficient to maintain said cracking temperature and render said pyrolysis self-sustaining but less than that required for complete stoichiometric combustion of said material.

3. The method of claim 1 wherein said cracking temperature is above about 800° C.

4. The method of claim 1 wherein oxygen is introduced into said second zone in an amount sufficient to maintain a cracking temperature of above about 800° C. but less than that required for complete stoichiometric combustion of wherein said material, said material in said first zone is heated indirectly by external heat, and wherein a portion of said gaseous fuel is burned to provide such external heat applied to said first zone.

5. The method of claim 1 wherein external heat is applied to said first pyrolysis zone, and a portion of said gaseous end product is the source of said external heat.

6. The method of claim 1 wherein said material is selected from the group consisting of fossil fuel and organic wastes.

7. The method of claim 1 wherein said cracking temperature is above about 800° C. and the time is maintained for about 1 to 30 seconds, and oxygen is introduced into said second zone at substantially a point source to effect continuous and substantially entire consumption thereof in a limited combustion area and thereby preclude buildup of free oxygen in the pyrolyzing gases, the amount of oxygen being less than that required for complete stoichiometric combustion.

8. The method of processing kraft black liquor material which comprises effecting destructive distillation and pyrolysis thereof in an enclosed zone at an elevated cracking temperature and for sufficient time to form an essentially inorganic smelt and a stable clean burning fuel as the gaseous end product which contains hydrogen sulfide, preventing recombination reactions of intermediate products comprising carbon free radicals to prevent formation of saturated and unsaturated aliphatic and polynuclear aromatic atmospheric pollutants by maintaining said temperature during such destructive distillation and pyrolysis, allowing said fuel to discharge from said zone, removing the hydrogen sulfide from said fuel by absorption with an alkali, and discharging said smelt from said zone for recovery of chemicals therefrom; said destructive distillation and pyrolysis being initiated in a first enclosed pyrolysis zone maintained by application of external heat at a temperature of about 400° C. to 750° C. to evaporate the black liquor to solids, and wherein hot effluent from said first zone is passed into a second enclosed pyrolysis zone wherein said cracking temperature is maintained above about 800° C. to prevent said recombination reactions and to form said stable gaseous fuel.

9. The method of claim 8 wherein oxygen is introduced into said second zone in an amount sufficient to maintain said cracking temperature and render said pyrolysis self-sustaining but less than that required for complete stoichiometric combustion of said material, and a portion of said gaseous end product is burned to provide such external heat applied to said first zone.

10. The method of claim 8 wherein said cracking temperature is above about 800° C. and the time is maintained for about 1 to 30 seconds, and oxygen is introduced into said second zone at substantially a point source to effect continuous and substantially entire consumption thereof in a limited combustion area and thereby preclude buildup of free oxygen in the pyrolyzing gases, the amount of oxygen being less than that required for complete stoichiometric combustion.

11. Apparatus for producing a stable gaseous fuel by effecting destructive distillation and pyrolysis of organic material while preventing formation of atmospheric pollutants comprising an enclosed vessel providing a first pyrolysis zone in which the pyrolysis is initiated, means for continuously introducing said material into said vessel, a fuel burner adjacent said vessel for externally heating the vessel to initiate pyrolysis of the material therein, an enclosed chamber in communication with said vessel to receive material therefrom and providing a second pyrolysis zone for completing said pyrolysis, an inlet for introduction of oxygen into said second zone, an outlet for passage of gaseous fuel from said second pyrolysis zone, and means for conducting fuel from said outlet to said burner as a source of heat for said vessel; said vessel being positioned upright within a furnace chamber, said second pyrolysis zone chamber having an upright portion below said vessel and a portion transverse to and communicating with the bottom of said upright portion, said outlet for passage of gaseous fuel being connected to said transverse portion adjacent an end thereof, the inlet for introduction of oxygen being connected to said upright portion, and means is provided to preheat said oxygen by utilizing said fuel as a heat source.

12. The apparatus of claim 11 wherein said oxygen preheating means comprises a preheater having a burner and communicating means for conducting said gaseous fuel from said second zone outlet to said preheater burner.

* * * * *

UNITED STATES PATENT OFFICE
CERTIFICATE OF CORRECTION

Patent No. 3,639,111  Dated February 1, 1972

Inventor(s) David L. Brink and Jerome F. Thomas

It is certified that error appears in the above-identified patent and that said Letters Patent are hereby corrected as shown below:

Column 1, before the heading "Background of the Invention", the following paragraph should be inserted --The invention described herein was made in the performance of work under research grants from the United States Public Health Service--. Column 5, line 57, "any" should read --and--. Column 6, claim 4, line 26, delete "wherein"; same line, before "said", second occurrence, insert --wherein--.

Signed and sealed this 9th day of January 1973.

(SEAL)
Attest:

EDWARD M. FLETCHER, JR.
Attesting Officer

ROBERT GOTTSCHALK
Commissioner of Patents